(No Model.)　　　　　　　　　　　　　　　　　　2 Sheets—Sheet 1.
J. A. SIMMONS.
COMBINED PLANTER AND DISTRIBUTER.
No. 499,856.　　　　　　　　　　　Patented June 20, 1893.
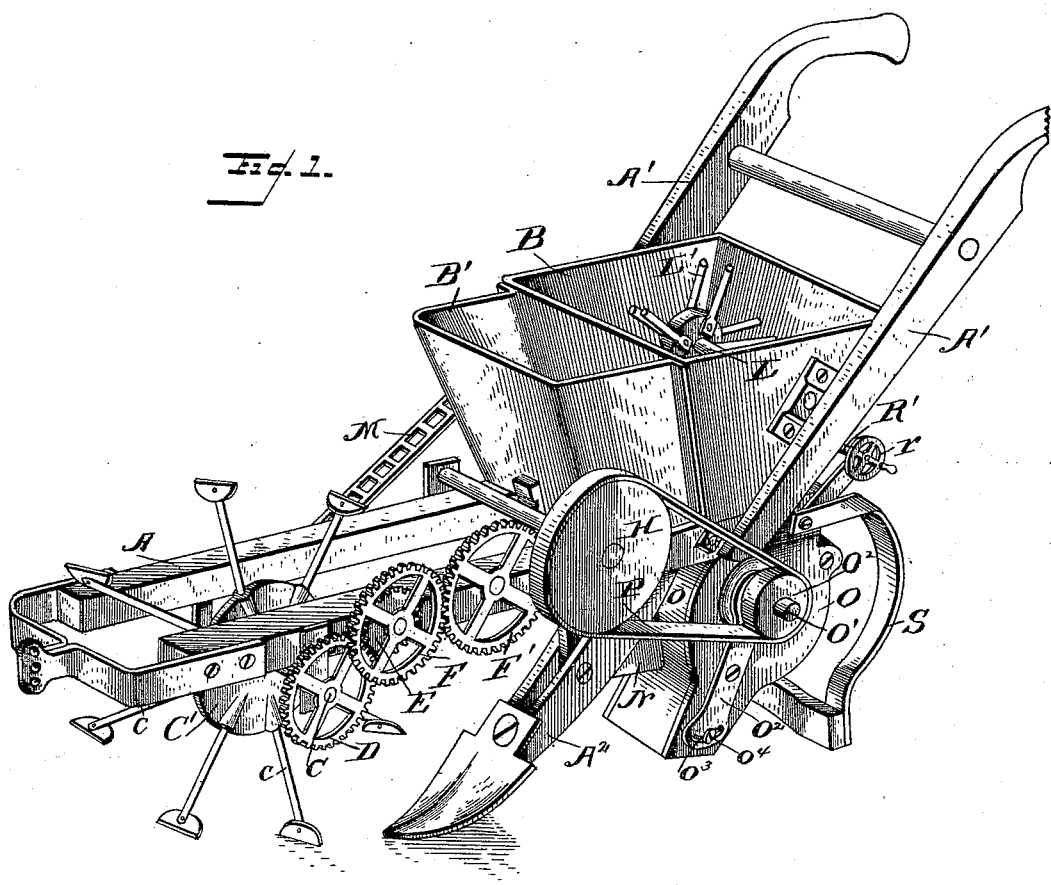
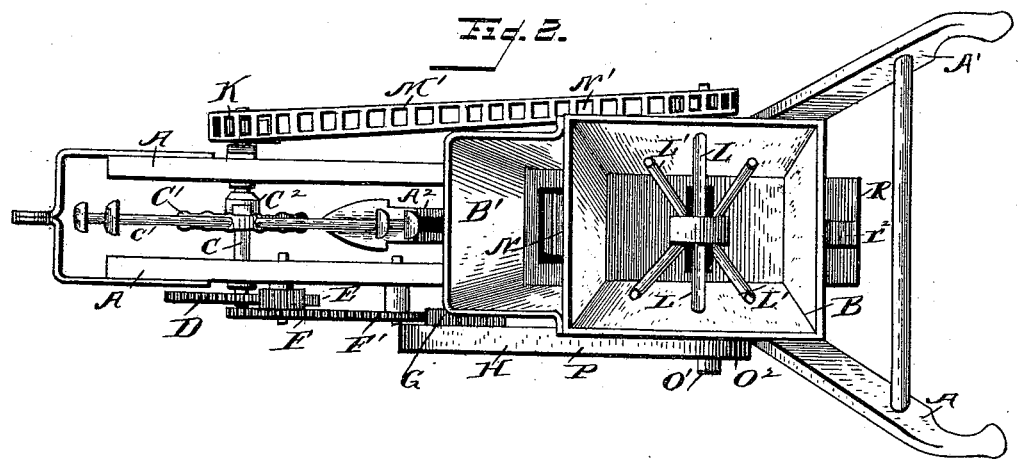
Witnesses　　　　　　　　　　　　　　　　Inventor
C. E. Hunt.　　　　　　　　　　　　　James A. Simmons,
M. J. McMahon,　　　　　　　　　　By J. R. Littell,
　　　　　　　　　　　　　　　　　　　his Attorney

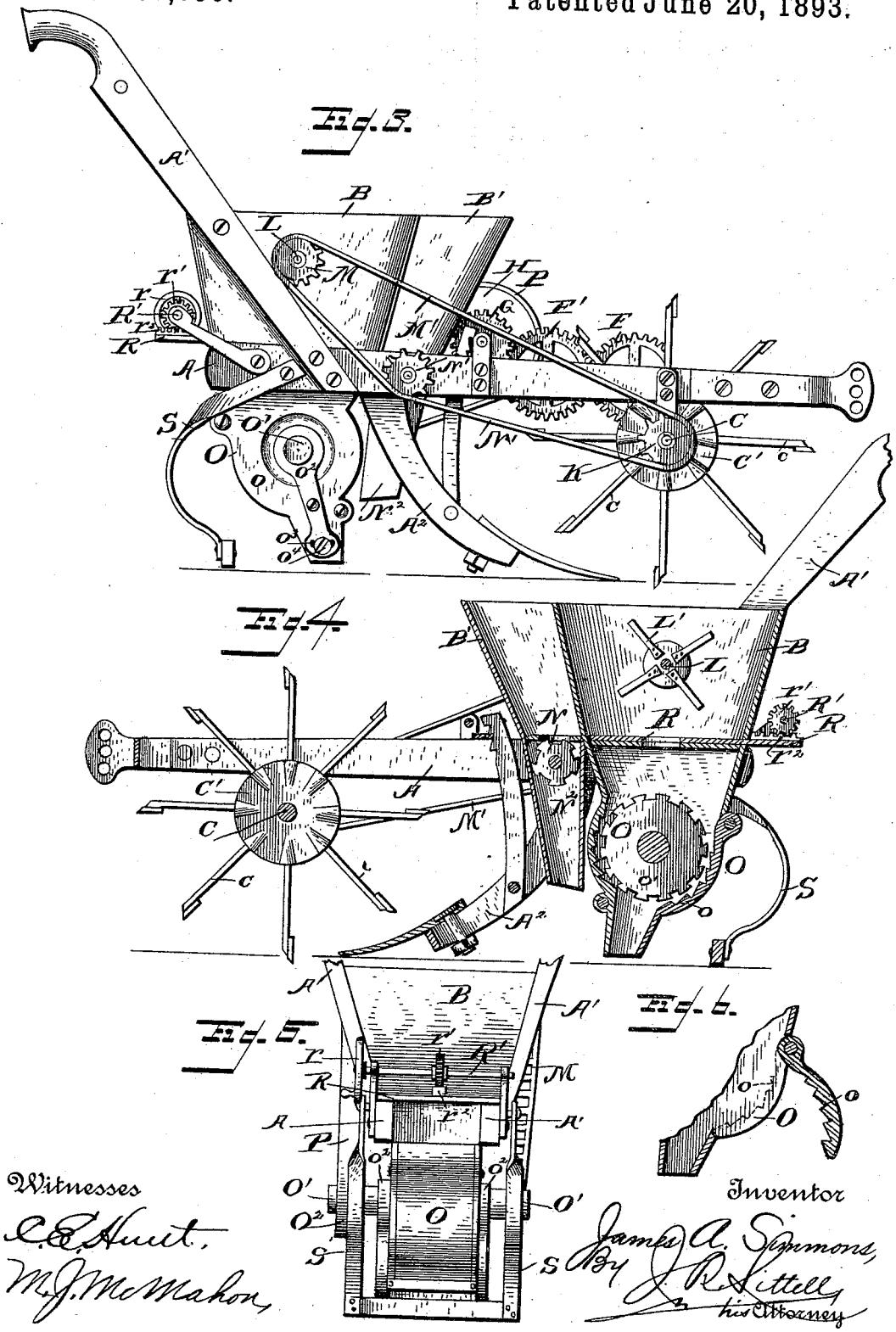

United States Patent Office.

JAMES A. SIMMONS, OF ENONDALE, MISSISSIPPI.

COMBINED PLANTER AND DISTRIBUTER.

SPECIFICATION forming part of Letters Patent No. 499,856, dated June 20, 1893.

Application filed August 24, 1892. Serial No. 443,978. (No model.)

*To all whom it may concern:*

Be it known that I, JAMES A. SIMMONS, a citizen of the United States, residing at Enondale, in the county of Kemper and State of Mississippi, have invented certain new and useful Improvements in a Combined Planter and Distributer; and I do hereby declare that the following is a full, clear, and exact description of the invention, which will enable others skilled in the art to which it appertains to make and use the same.

This invention is a combined planter and distributer and has for its object to provide certain novel features by means of which the fertilizer is ground before distribution, and by means of which the feed is regulated.

My invention consists in the peculiar construction of the various parts and their novel combination or arrangement, all of which will be more fully hereinafter described and claimed.

In the drawings forming a part of this specification, Figure 1 is a perspective view of my combined implement. Fig. 2 is a top or plan view. Fig. 3 is a side elevation. Fig. 4 is a vertical longitudinal sectional view. Fig. 5 is a rear elevation. Fig. 6 is a detail view of the hinged rear flap of the crusher-cylinder In constructing my improved implement, I employ a horizontal frame, A, inclined handles A', and plow standard $A^2$. A main hopper B is arranged upon the rear end of the frame A and directly forward of this is a second hopper B'. An axle C is journaled to the forward portion of the frame and upon this axle is mounted the drive wheel C', said wheel carrying radial spokes having on their outer ends segmental blades $c$ for the purpose of breaking the ground and preventing the spokes sinking too far into the same. A clutch $C^2$ is also mounted upon the axle C and is adapted to operate in connection with the drive wheel, by means of a hand lever (not shown) of any suitable construction, by means of which the drive wheel can be thrown in or out of gear as desired. A gear wheel D is mounted upon the end of the axle C, said gear meshing with a pinion shaft E, mounted upon the side of frame. A gear F is mounted on the pinion shaft E and meshes with a gear F' which in turn meshes with a pinion shaft G upon which is mounted a pulley wheel H.

Upon the opposite end of the axle C is mounted a sprocket wheel, K. A horizontal shaft L is passed through the hopper B and carries the stirrer arms L'. A sprocket wheel M is mounted upon the end of the shaft L and over this sprocket and the wheel K is passed a link belt M'. A bucket wheel N is arranged in the bottom of the hopper B' and upon the end of its shaft is arranged a sprocket N', which is also operated by the belt M'. A delivery chute $N^2$ depends from the hopper B' and is arranged between the members of the plow standard, and rests directly behind the plow. This hopper is used in distributing phosphates.

O indicates my improved fertilizer crusher, said crusher being arranged beneath the main hopper B, and consists of the cylinder portion $o$ and the drum $o'$ said drum being arranged within the cylinder and is journaled in bearing $o^2$ pivoted upon the exterior of the cylinder and made adjustable by means of the slot $o^3$ and set screw $o^4$ by means of which the cotton seed fertilizer can be ground as fine as desired since the drum can be adjusted with relation to the serrated interior adjacent wall of the cylinder by the movable bearing just described.

O' indicates the shaft of the drum, and upon the end of this shaft is mounted a pulley wheel $O^2$, and P indicates a belt passing over this wheel and the wheel H whereby power is transmitted from the axle to the drum.

The drum and cylinder are each formed with teeth integral with their bodies thus dispensing with removable bits.

An adjustable feed slide R is arranged in the bottom of the hopper B to regulate the delivery and crusher, said slide being adjusted by means of a shaft R' carrying a hand wheel $r$ and a pinion $r'$ which engages a rack $r^2$ upon the end of the slide and by turning the hand wheel the slide can be moved in or out as desired.

When it is desired to plant cotton seed the crusher is removed and a tin delivery chute attached instead. A spring coverer S is then employed to cover the seed.

The crusher has a hinged rear side by means of which the device can be readily cleaned or repaired.

The operation of my improved device having been partially set forth in the description of its construction it will be clear to every one acquainted with planters and distributers and a further description is unnecessary.

Having thus described the invention, what I claim is—

1. The combination, with the frame and hopper of the crusher composed of the cylinder and adjustable drum having integral teeth, substantially as shown and described.

2. The combination, with the hopper, of the crusher cylinder having integral teeth and a hinged rear side and the adjustable drum having integral teeth, substantially as shown and described.

3. The combination, with a frame and hopper, comprising two separate hopper compartments of the adjustable feed slide, for both compartments, and the hand wheel, shaft, pinion and rack for operating said slide, substantially as shown and described.

4. The combination, with the frame and hopper, of the crusher arranged beneath the same and composed of a cylinder and drum, the drive wheel having radial spokes with ground-breaking blades on their ends and having a clutch and hand lever, and the intermediate gearing devices between the drive wheel and drum, substantially as shown and described.

5. The combination, with the frame and hopper of the stirrer wheel and shaft, the drive wheel, having radial spokes carrying ground-breaking blades and gearing connected therewith, the delivery chute and spring coverer, substantially as shown and described.

6. The combination, with the rear hopper, rotary stirrer arms therein, adjustable rotary crushing mechanism underneath and communicating with said rear hopper, a delivery chute under the crushing mechanism, and a seed hopper in front of the rear hopper and provided with feed and delivery devices, of a ground-breaking drive-wheel communicating motion to said crushing and feed mechanisms, substantially as set forth.

7. The combination, with the rear-hopper having rotary stirring mechanism, of a rotary adjustable crusher arranged beneath and in communication with said hopper and a ground-breaking drive-wheel imparting motion to said stirring and crushing mechanisms, substantially as set forth.

8. The combination, with a ground-breaking drive-wheel traveling in front of and imparting motion to all of the moving parts of the implement, of an opening plow following behind the drive-wheel, seed feeding and dropping devices directly behind the plow, fertilizer stirring, crushing and delivering mechanism behind the seed-planter, and a spring-cover following last; all the parts being on a common frame in operative relation, substantially as set forth.

In testimony whereof I affix my signature in presence of two witnesses.

JAMES A. SIMMONS.

Witnesses:
 F. V. BRAHAN,
 S. S. WILLIAMS.